(12) United States Patent
Sugihara

(10) Patent No.: US 8,013,933 B2
(45) Date of Patent: *Sep. 6, 2011

(54) IMAGING-DEVICE CLEANING APPARATUS

(75) Inventor: Hiroyasu Sugihara, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/714,938

(22) Filed: Mar. 1, 2010

(65) Prior Publication Data

US 2010/0149411 A1    Jun. 17, 2010

Related U.S. Application Data

(63) Continuation of application No. 11/739,586, filed on Apr. 24, 2007, now Pat. No. 7,697,063, which is a continuation of application No. 10/795,060, filed on Mar. 5, 2004, now Pat. No. 7,222,388.

(30) Foreign Application Priority Data

Apr. 10, 2003   (JP) ................................ 2003-106790

(51) Int. Cl.
*H04N 5/225* (2006.01)
*G03B 17/48* (2006.01)
*G03B 19/00* (2006.01)
*G03B 29/00* (2006.01)

(52) U.S. Cl. ........................................ 348/375; 396/429

(58) Field of Classification Search .................. 348/363, 348/374, 375; 396/352, 358, 402
See application file for complete search history.

(56) References Cited

U.S. PATENT DOCUMENTS 5,337,098 A * 8/1994 Imafuji et al. .................. 396/55
2003/0214599 A1* 11/2003 Ito et al. ......................... 348/335

* cited by examiner

*Primary Examiner* — Sinh Tran
*Assistant Examiner* — Albert Cutler
(74) *Attorney, Agent, or Firm* — Canon USA, Inc. IP Divison

(57) ABSTRACT

An imaging-device cleaning apparatus is attached to a camera by engaging with a lens mount of the camera typically used for attaching a camera lens. The imaging-device cleaning apparatus includes a nozzle for removing dust and dirt in the vicinity of an imaging section of the camera, and a motor and a fan for supplying air to the nozzle to remove the dust and dirt from the vicinity of an image sensor of the camera.

1 Claim, 8 Drawing Sheets

IMAGING-DEVICE CLEANING APPARATUS

CROSS-REFERENCE TO RELATED APPLICATIONS

The present application is a continuation of U.S. patent application Ser. No. 11/739,586, filed Apr. 24, 2007, entitled "IMAGING-DEVICE CLEANING APPARATUS", which is a continuation of U.S. patent application Ser. No. 10/795,060, filed Mar. 5, 2004, entitled "IMAGING-DEVICE CLEANING APPARATUS", the content of which is expressly incorporated by reference herein in its entirety. Further, the present application claims priority from Japanese Patent Application No. 2003-106790, filed Apr. 10, 2003, which is also hereby incorporated by reference herein in its entirety.

BACKGROUND OF THE INVENTION

1. Field of the Invention

The present invention relates to an imaging-device cleaning apparatus.

2. Description of the Related Art

Recently, a large number of digital cameras that record still images with image sensors including a CCD have been available on the market. Such digital cameras do not require photo films. Instead, the digital cameras focus images on image sensors including a CCD and store the image data onto external storage devices, such as memory cards or hard disk drives. Unlike photo films, the external storage devices allow repeated writing and erasing of the images, thus conveniently reducing the operational cost for consumable supplies.

The structure of a single-lens reflex (SLR) digital camera with interchangeable lenses tends to accumulate dust and dirt in the vicinity of the image sensors when the lenses are changed. The dust and dirt stick to the surface of a filter mounted in the vicinity of the imaging surface, and shadows of the dust and dirt sensed by the image sensors degrade the quality of the images. Unlike photo film, the imaging surface of the image sensor is not replaced for each shot. Accordingly, once the dust and dirt stick to the image sensor, their shadows appear in every photo image unless they are removed. To solve these problems, the image sensor unit may be sealed as tightly as possible or the filter may be positioned far from the image sensor. Alternatively, a user can detach a lens from the camera and expose the image sensor to air in a special mode to remove the dust and dirt sticking to the surface of the image sensor with a blower.

One of the known arts, for example, Japanese Patent Laid-Open No. 2002-229110, discloses a camera technology that removes dust and dirt sticking to an imaging section by an airflow generator incorporated into a camera body. Unfortunately, in the above-described technology to seal the image sensor unit, if the camera has a mechanical focal-plane shutter, the shutter unit itself must be sealed. This sealed structure is disadvantageously complicated and bulky. In addition, even if the shutter unit is sealed, sliding shutter blades, which are part of the mechanical shutter, cause the surfaces of the parts to wear and generate metal particles. The particles stick to the image sensor unit. According to the other solution in which the surface of the filter is positioned far from the image sensor, as described above, shadows of the dust and dirt can be out of focus on the imaging surface. However, the blurs of the shadows still appear on the image. Therefore, this is not an ideal solution.

A user can detach a lens from the camera and expose the image sensor to air in a special mode, and then can remove the dust and dirt sticking to the surface of the image sensor with a blower. In this case, the top of the blower may accidentally damage the image sensor or the shutter.

According to the above-described patent, the dust and dirt can be removed from the imaging surface. However, the built-in airflow generator requires a modification of the camera body structure which requires increased assembly parts, thus disadvantageously resulting in increased cost and complicated assembly.

SUMMARY OF THE INVENTION

It is an object of the present invention to provide an imaging-device cleaning apparatus for preventing the imaging device from being bulky and costly by providing the cleaning apparatus as one of the accessories of the imaging device, which does not require a change in the structure of the imaging device.

It is another object of the present invention to provide a cleaning apparatus for users to easily remove dust and dirt sticking to the vicinity of the imaging section without damaging it.

To achieve at least one of the above-described objects, according to an embodiment of the present invention, a imaging-device cleaning apparatus includes a mount for the cleaning apparatus attaching to the imaging device by engaging with a lens mount of the imaging device detachably and replaceably supporting the lens, a communication unit in the vicinity of the mount for communicating with the imaging device, a detection unit for detecting whether the cleaning apparatus is attached to the imaging device by the mount, a removing unit for removing dust and dirt in the vicinity of an imaging section of the imaging device, and a control unit for controlling the operation of the removing unit in response to the output of the detection unit.

Further objects, features and advantages of the present invention will become apparent from the following description of the preferred embodiments with reference to the attached drawings.

DESCRIPTION OF THE PREFERRED EMBODIMENTS

An embodiment of the present invention will now be described.

Figure 1:
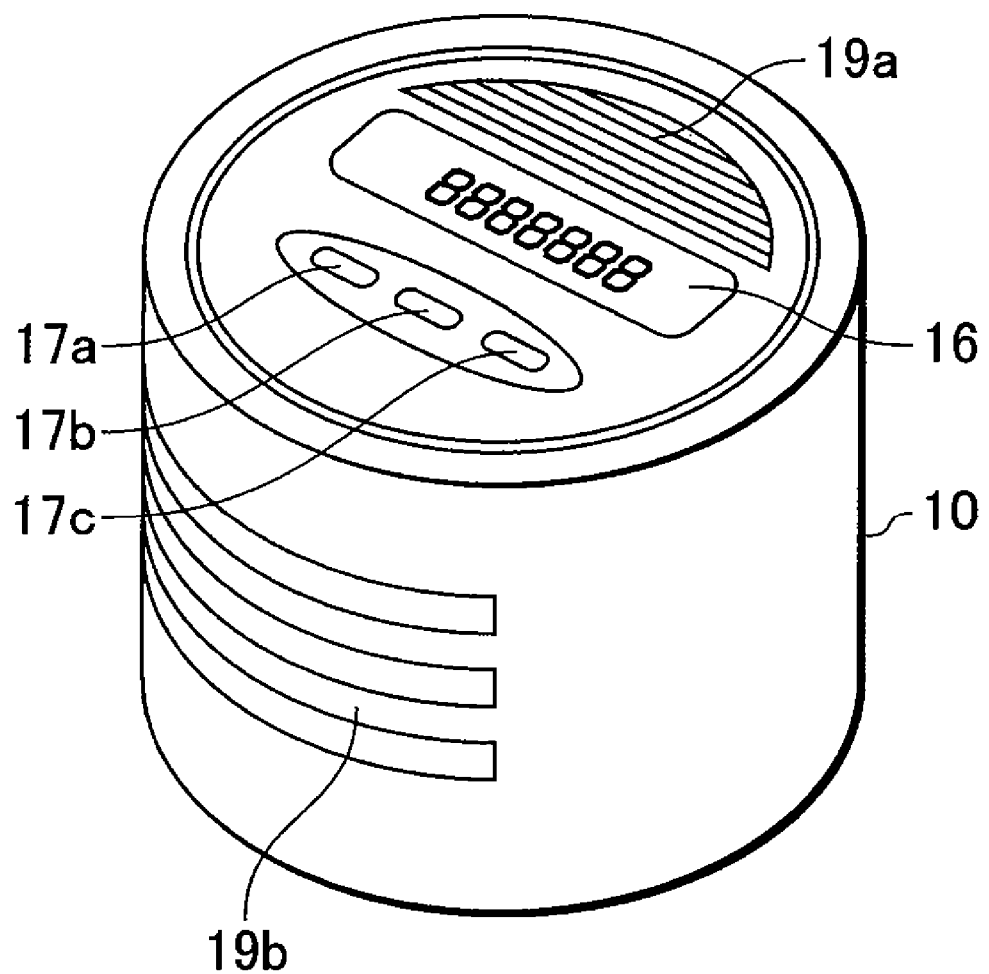
FIG. 1 is an external perspective view of an imaging-device cleaning apparatus according to an embodiment of the present invention with its front side upward.
Figure 2:
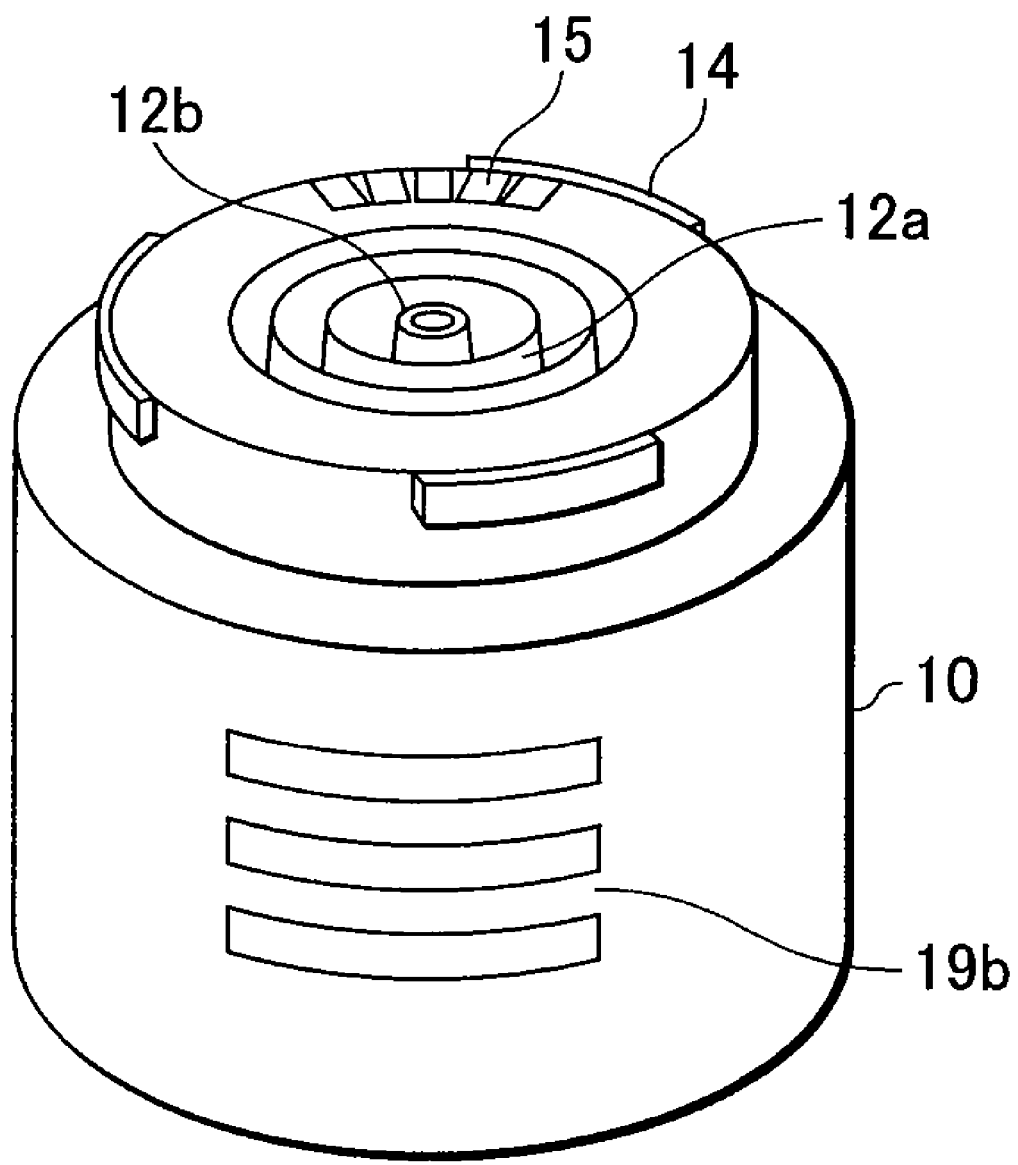
FIG. 2 is an external perspective view of the imaging-device cleaning apparatus according to the embodiment of the present invention with its back side upward.

FIGS. 1 and 2 show an external view of an imaging-device cleaning apparatus according to the embodiment. FIG. 1 is a view of the imaging-device cleaning apparatus according to the embodiment with its front/top side facing upward. In FIG. 1, a body of the imaging-device cleaning apparatus 10 is shown. The imaging-device cleaning apparatus 10 includes the following components on its front: a display unit 16 composed of a liquid crystal display, operation buttons 17a, 17b, and 17c, and an intake duct 19a for taking in air to generate airflow. A filter (not shown) is mounted on the intake duct 19a to prevent external dust and dirt from flowing in the body. The display unit 16 displays operation status or messages by images or characters. The display unit 16 is composed of, for example, a composite of an LCD, an LED, and an element that produces sound. For example, the display unit 16 displays the intensity of the airflow ejected from the imaging-device cleaning apparatus 10, required time for cleaning, elapsed time of the cleaning, remaining time of battery power in a camera body 20 shown in FIG. 3, a buzzer setting status, error messages, various information in multiple-digit display, mounting or dismounting of the camera body 20, date and time, and a connection status with a CPU 13b of the camera body shown in FIG. 3. The imaging-device cleaning apparatus 10 has operation buttons 17a, 17b, and 17c. The operation button 17a is a power on/off switch of the imaging-device cleaning apparatus 10. The operation button 17b is a cleaning start switch that initiates cleaning. The operation button 17c is an airflow adjusting switch that adjusts the airflow rate ejected from the imaging-device cleaning apparatus 10. These operation switches may determine a cleaning time, a buzzer setting, and drive settings of cleaning parts. An exhaust outlet 19b is arranged on the side of the imaging-device cleaning apparatus 10 to discharge air ejected from a nozzle. A filter (not shown) is mounted on the exhaust outlet 19b to clean the discharged air. The imaging-device cleaning apparatus 10 is driven by a commercial AC power supply 34 shown in FIG. 7. The imaging-device cleaning apparatus 10 has an AC power supply connector 35 shown in FIG. 7.

FIG. 2 is a view of the imaging-device cleaning apparatus 10 with its back/bottom side facing upward.

Figure 4:
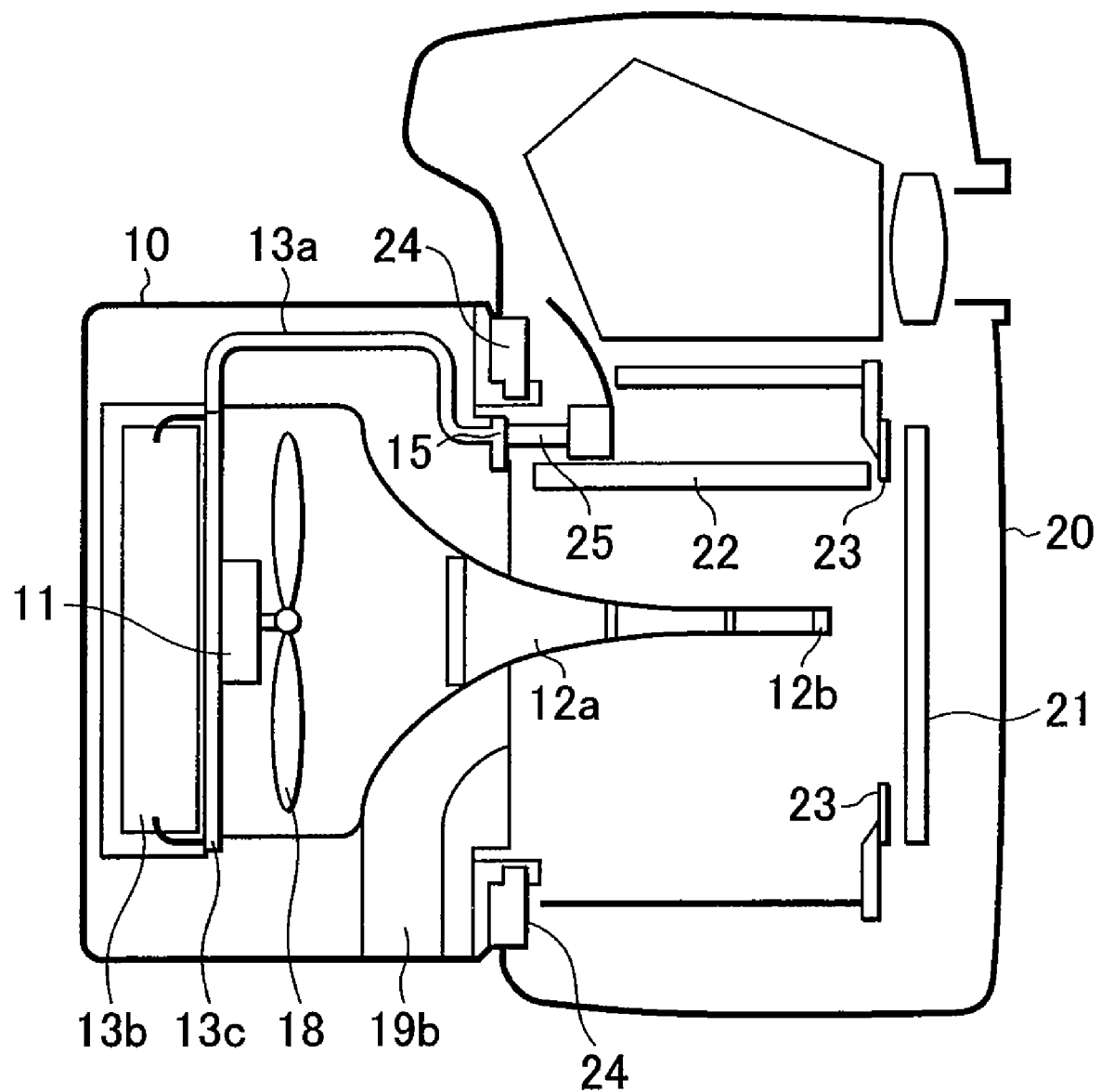
FIG. 4 is a sectional view of the imaging-device cleaning apparatus according to the embodiment of the present invention attached to the camera body when the cleaning operation of the cleaning apparatus is active.

A mount 14 for attaching the camera body 20 of an interchangeable-lens camera is arranged on the back/bottom side of the imaging-device cleaning apparatus 10. The camera body 20 is described below. Signal terminals 15 are disposed on the mount 14 of the cleaning apparatus to electrically communicate with the camera body 20. A nozzle 12a, which cleans the image sensor, is normally collapsed and is accommodated in the center of the back/bottom side of the imaging-device cleaning apparatus 10. Before cleaning, the nozzle 12a extends to approach the vicinity of an image sensor 21, as shown in FIG. 4. The image sensor 21 will be described below. During the extension of the nozzle 12a, if the nozzle 12a touches an obstacle, such as a mirror 22 or a shutter 23, an obstacle detection unit 12b detects it and notifies the result to a CPU 13b of the imaging-device cleaning apparatus 10. The CPU 13b is described below.

Figure 3:
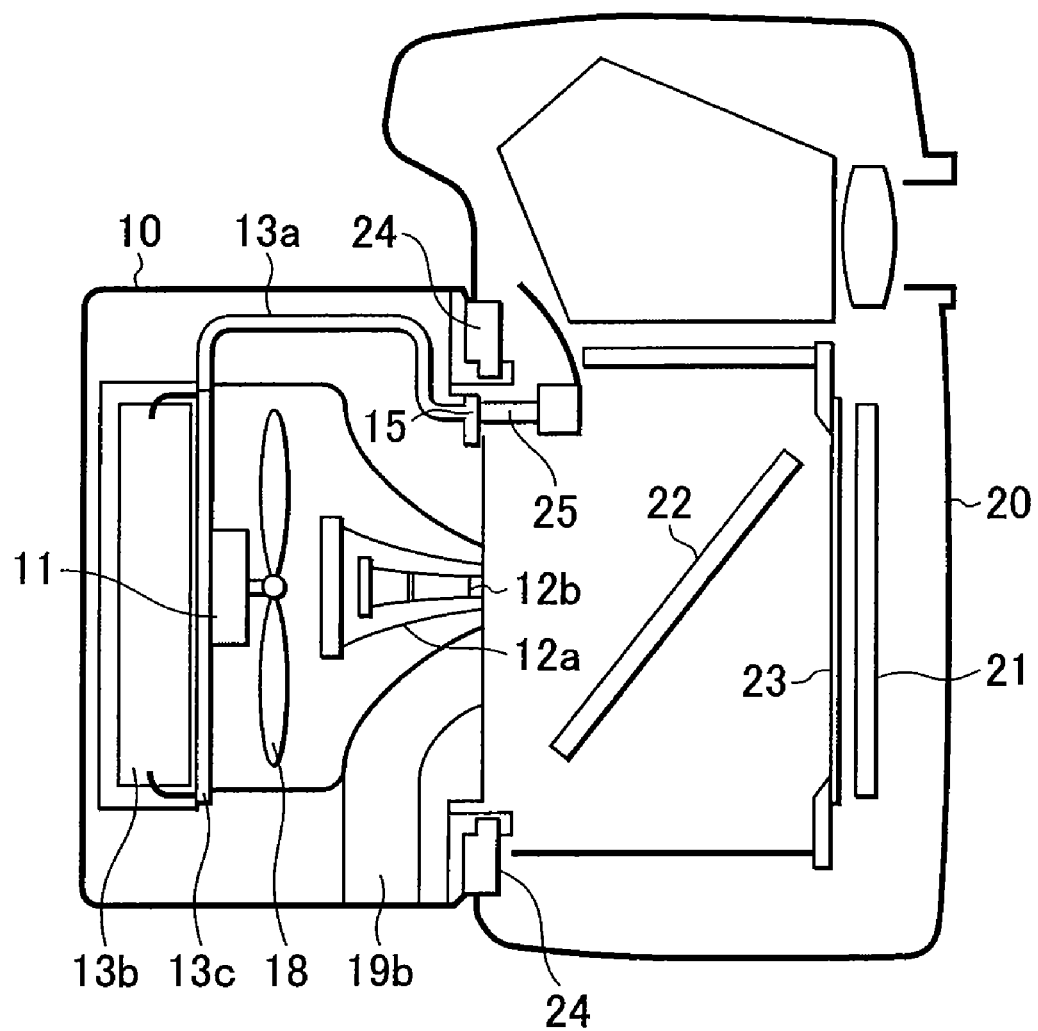
FIG. 3 is a sectional view of the imaging-device cleaning apparatus according to the embodiment of the present invention attached to a camera body when the cleaning operation of the cleaning apparatus is inactive.

FIG. 3 is a longitudinal central sectional view of the imaging-device cleaning apparatus 10 attached to the camera body 20 when the cleaning operation is inactive.

With reference to FIG. 3, the nozzle 12a, which is a cleaning part, is collapsed and accommodated in the center of the imaging-device cleaning apparatus 10. A fan 18 is mounted in the vicinity of the intake port of the nozzle 12a to generate airflow. The fan 18 is coupled with a shaft of a motor 11 and is rotated with the rotation of the motor 11. The motor 11 and the CPU 13b are mounted on a circuit board 13c. The CPU 13b of the imaging-device cleaning apparatus 10 controls the motor 11 to change the rotation speed. The circuit board 13c is connected to the signal terminals 15 via a connector 13a. A mount 24 of the camera body mechanically connects a lens to the camera body 20. Signal terminals 25 are arranged on the mount 24 of the camera to electrically connect the lens to the camera body 20, thereby providing various types of functions including power supply.

As shown in FIG. 3, the signal terminals 15 of the imaging-device cleaning apparatus 10 are arranged so as to electrically contact the signal terminals 25 of the camera body 20 when the imaging-device cleaning apparatus 10 is attached to the camera body 20. Accordingly, the CPU 13b of the imaging-device cleaning apparatus 10 can communicate with the CPU 40 of the camera body shown in FIG. 7. A mirror 22 can lead light incident on the lens to an optical finder by a single-lens reflex mechanism. The mirror 22 may be either a quick return mirror or a half mirror. The shutter 23 controls exposure on the image sensor 21. The image sensor 21 converts an optical image into electronic signals.

FIG. 4 is a longitudinal central sectional view of the imaging-device cleaning apparatus 10 attached to the camera body 20 when the cleaning operation is active.

During the operation of the imaging-device cleaning apparatus 10, the CPU 13b controls the camera body 20 so that the mirror 22 pops up to shunt and the shutter 23 remains open. The nozzle 12a extends towards the image sensor 21 under the control of the CPU 13b of the imaging-device cleaning apparatus 10. The length of the nozzle 12a is determined such that the top of the nozzle 12a does not touch the image sensor 21 even at its maximum length.

Figure 5:
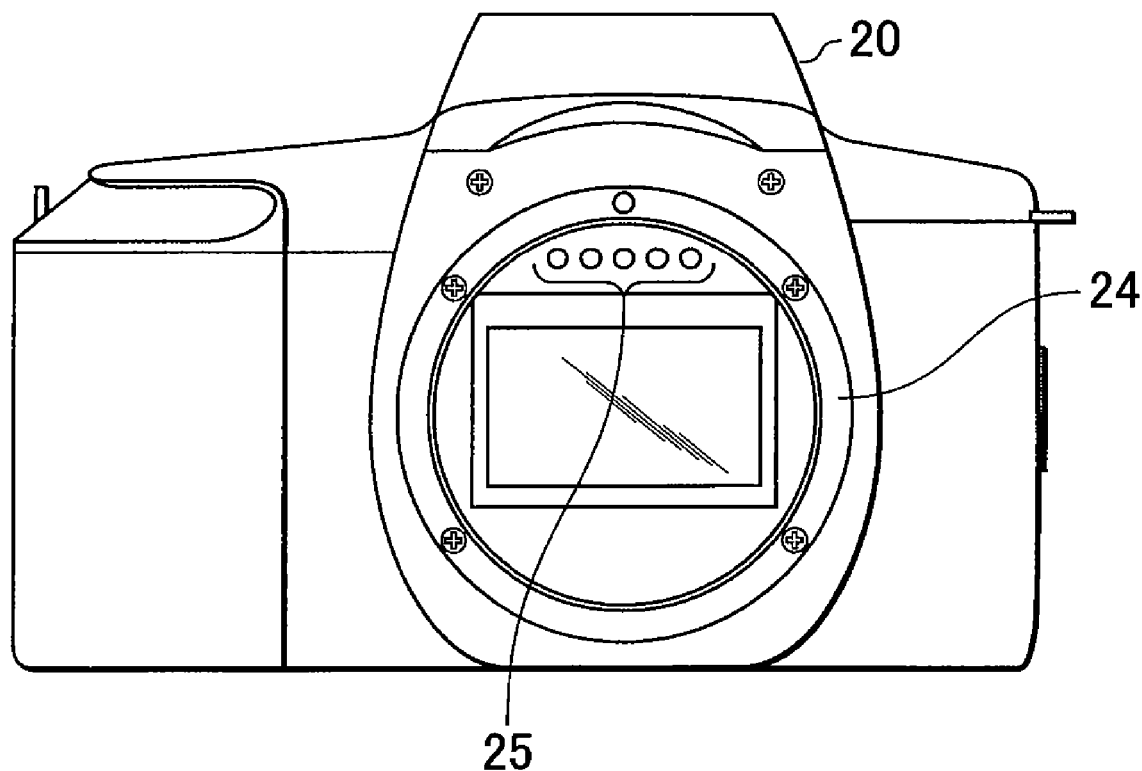
FIG. 5 is a front view of the digital camera used in the embodiment of the present invention with a lens detached.

FIG. 5 is a front view of the camera body 20 with a lens removed.

As described above, the mount 24 of the camera mechanically connects the lens to the camera body 20. The signal terminals 25 are arranged on the mount 24 of the camera to electrically connect the lens to the body 20, thereby providing various types of functions including power supply.

Figure 6:
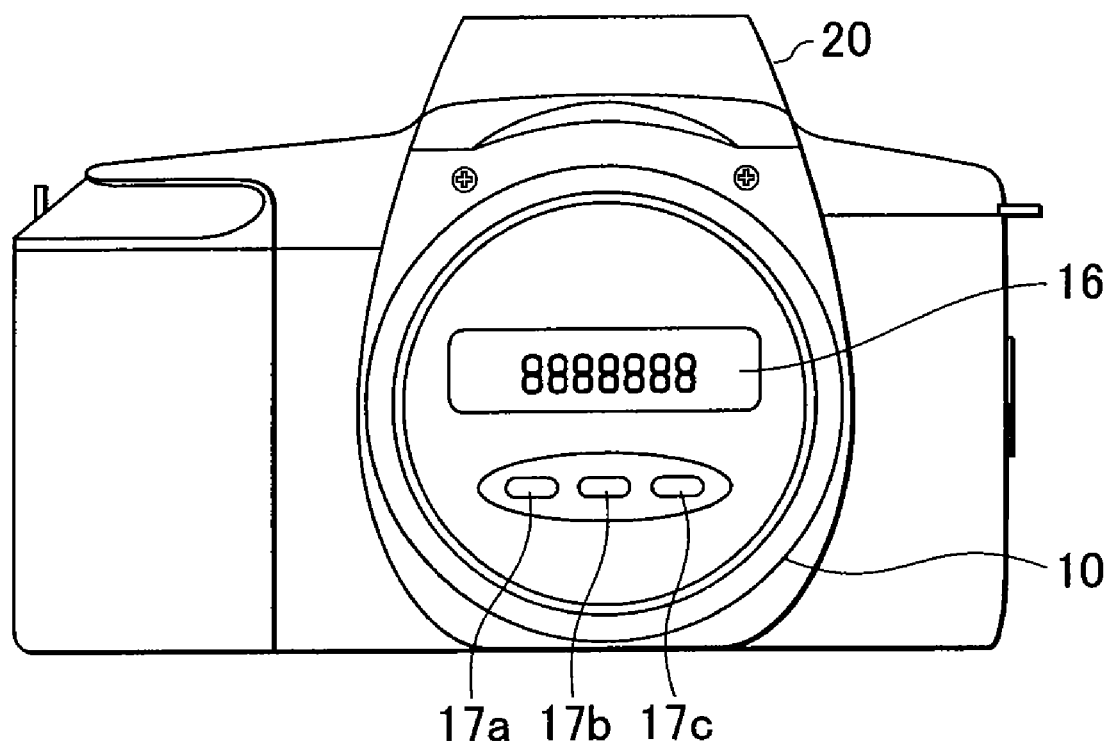
FIG. 6 is a front view of the imaging-device cleaning apparatus according to the embodiment of the present invention attached to the digital camera.

FIG. 6 is a front view of the imaging-device cleaning apparatus 10, according to the present embodiment, attached to the camera body 20 shown in FIG. 5. Like elements to those illustrated and described in the previous drawings are designated by like reference numerals in FIG. 6.

Herein, the mount 14 of the imaging-device cleaning apparatus 10 is fitted to the mount 24 of the camera body 20, like mounting of an interchangeable lens.

Figure 7:
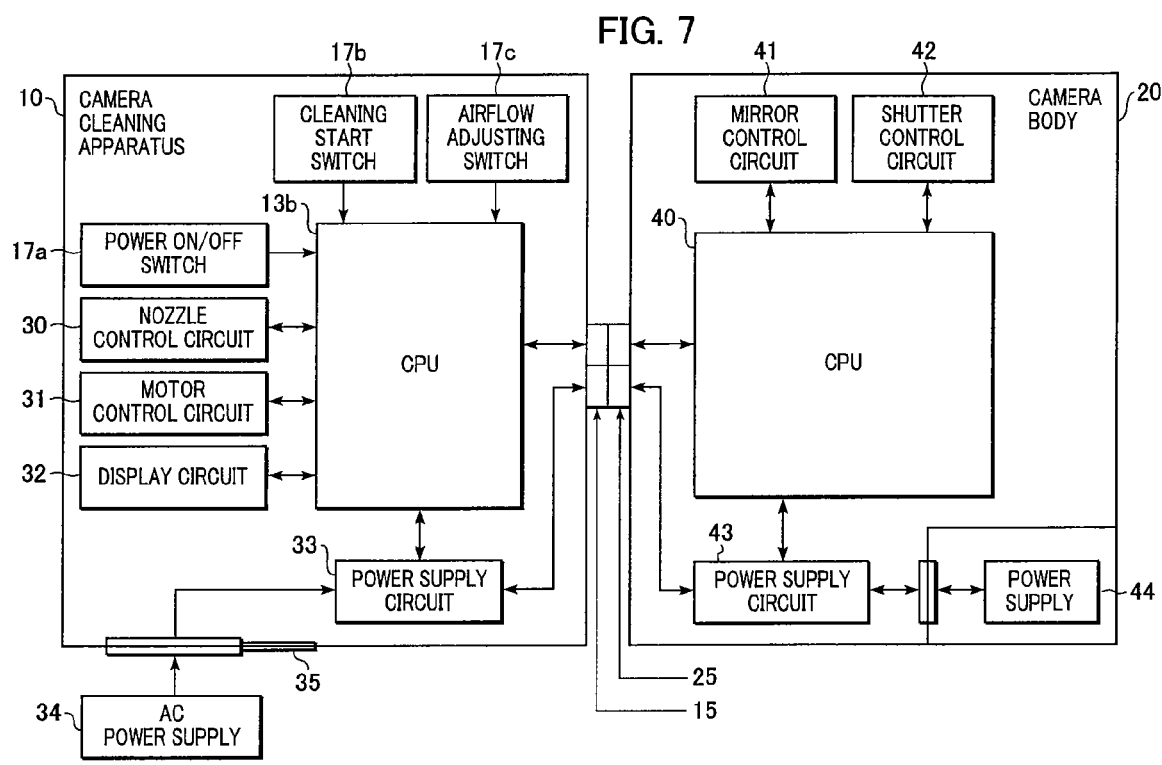
FIG. 7 is a block diagram showing a structure of the imaging-device cleaning apparatus according to the embodiment of the present invention attached to the camera.

FIG. 7 is a block diagram showing the structures of the imaging-device cleaning apparatus 10 and the camera body 20 according to the embodiment, in which like elements to those illustrated and described in the previous drawings are designated by like reference numerals.

The CPU 13b of the imaging-device cleaning apparatus 10 receives a power-on signal from the power on/off switch 17a, a cleaning start signal from the cleaning start switch 17b, and an airflow adjusting signal from the airflow adjusting switch 17c. The CPU 13b of the imaging-device cleaning apparatus 10 mutually communicates with a nozzle control circuit 30, a motor control circuit 31, a display circuit 32, and a power supply circuit 33.

The nozzle control circuit 30 extends the nozzle in response to a nozzle extending signal from the CPU 13b. If the obstacle detection unit 12b on the top of the nozzle senses some obstacle, the nozzle control circuit 30 notifies the result to the CPU 13b.

The motor control circuit 31 controls starting or stopping the motor 11, as well as the rotation speed of the motor 11 in response to the signals from the cleaning start switch 17b and the airflow adjusting switch 17c via the CPU 13b.

The display circuit 32 receives the operational results of the power on/off switch 17a, the cleaning start switch 17b, and the airflow adjusting switch 17c, and power statuses from the power supply circuit 33 and the camera body 20. The display circuit 32 controls the display unit 16 to display the information associated with the received operational results.

The power supply circuit 33 of the imaging-device cleaning apparatus 10 receives electric power from the AC power supply 34 via the AC power supply connector 35. The power supply circuit 33 transmits the status of the AC power supply 34 to the CPU 13b of the imaging-device cleaning apparatus 10.

The CPU 13b of the imaging-device cleaning apparatus 10 communicates with the CPU 40 of the camera body via the signal terminals 15 of the imaging-device cleaning apparatus 10 and the signal terminals 25 of the camera body to receive signals representing the statuses of a mirror-up, opening of the shutter, and the status of a power supply 44 in the camera body 20.

The power supply circuit 33 of the imaging-device cleaning apparatus 10 communicates with a power supply circuit 43 of the camera via the signal terminals 15 of the imaging-device cleaning apparatus 10 and the signal terminals 25 of the camera to mutually sense the statuses of the power supplies at all times. The CPU 40 of the camera communicates with a mirror control circuit 41, a shutter control circuit 42, and the power supply circuit 43 of the camera.

The CPU 40 of the camera, upon receipt of a power-on command from the CPU 13b of the imaging-device cleaning apparatus 10, transmits a power-on command to the power supply circuit 43. Upon receipt of a cleaning-mode command signal, the CPU 40 transmits a mirror-up signal and a shutter opening signal to the mirror control circuit 41 and the shutter control circuit 42, respectively.

The power supply circuit 43 communicates with the power supply 44 to sense the amount of charge remaining in the power supply 44. The power supply circuit 43 transmits the resultant amount in the power supply of the camera to the CPU 40 and the power supply circuit 33 of the imaging-device cleaning apparatus 10.

Figure 8:
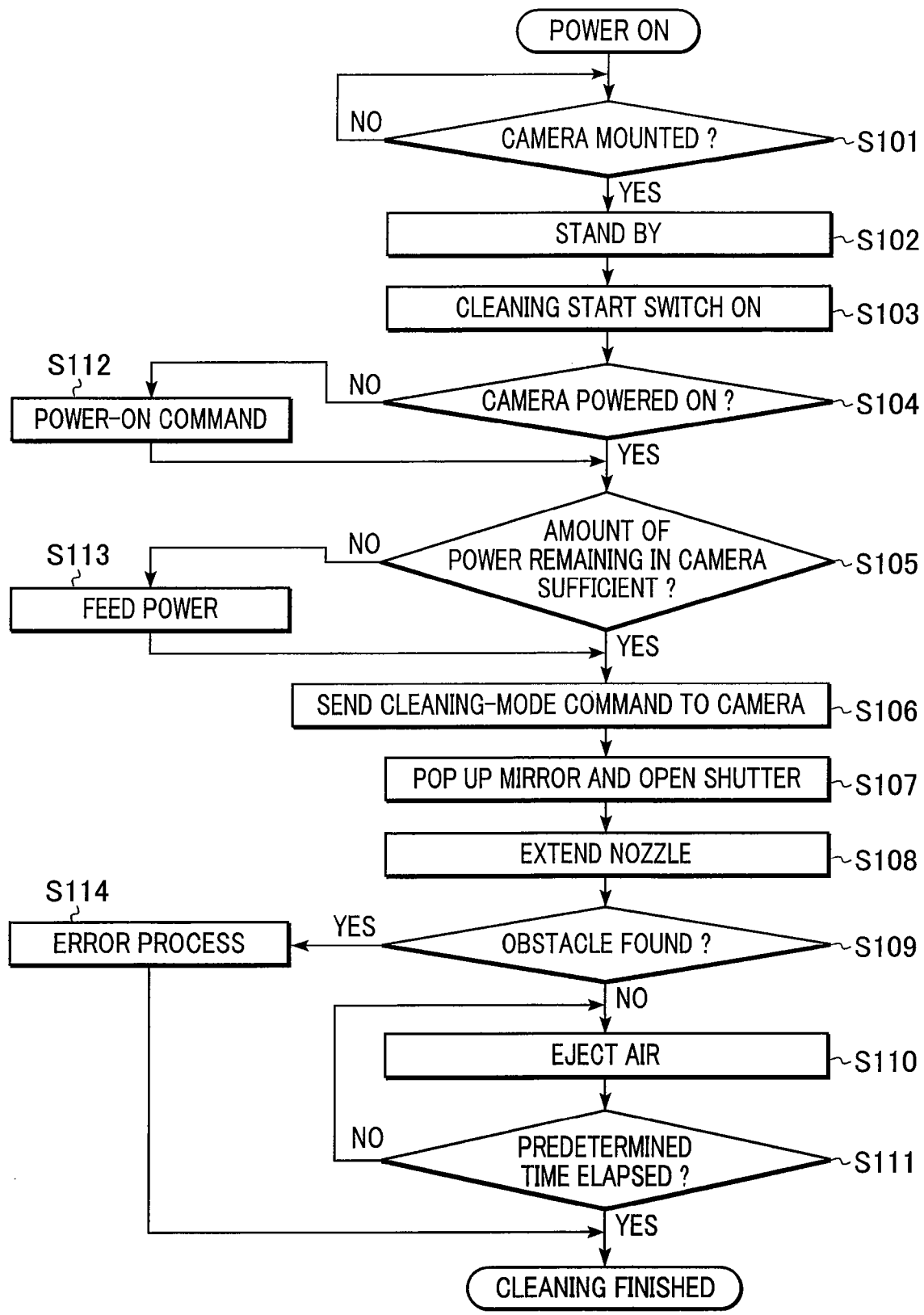
FIG. 8 is a flow chart for explaining processes in the imaging-device cleaning apparatus according to the embodiment of the present invention.

The operation of the imaging-device cleaning apparatus 10 will now be described with reference to the flow chart of FIG. 8.

The operation starts with power-on of the imaging-device cleaning apparatus 10 by the power on/off switch 17a. In step S101, the imaging-device cleaning apparatus 10 determines if it is mounted on the camera body 20. This is performed by checking if communication with the camera body 20 is available via the signal terminals 15. If the imaging-device cleaning apparatus 10 is mounted on the camera body 20, then the operation proceeds to S102, where the imaging-device cleaning apparatus 10 enters a standby state. During the standby state in step S102, various types of setting for cleaning can be carried out by using the power on/off switch 17a, the cleaning start switch 17b, and the airflow adjusting switch 17c. In particular, the settings include adjustment of intensity of the airflow and a setting of cleaning time.

Subsequently, the operation proceeds to step S103. If the cleaning start switch 17b is on, then the operation proceeds to step S104. In step S104, the imaging-device cleaning apparatus 10 senses if the power supply 44 of the camera body 20 is powered on. If the power of the camera body 20 is on, then the process proceeds to step S105. In step S105, the imaging-device cleaning apparatus 10 communicates with the power supply circuit 43 of the camera body 20 via the power supply circuit 33 to sense the amount of charge remaining in the power supply 44 of the camera body 20.

If, in step S104, the power supply 44 of the camera body 20 is not powered on, the process proceeds to step S112. In step S112, the imaging-device cleaning apparatus 10 transmits a control signal that commands power-on to the camera body 20. After the camera body 20 is powered on, the process proceeds to step S105.

In step S105, if the amount of charge remaining in the power supply 44 is sufficient, then the process proceeds to step S106. In step S106, the imaging-device cleaning apparatus 10 transmits a control signal that commands a cleaning mode to the camera body 20 and displays the cleaning mode message on the display unit 16 to notify a user. Herein, in the cleaning mode of the camera body 20, the mirror 22 of the camera body 20 pops up to shunt and the shutter 23 remains open. On the other hand, if in step 105 the amount of charge remaining in the power supply in the camera body 20 is not sufficient, then the process proceeds to step S113. In step S113, the imaging-device cleaning apparatus 10 supplies the camera body 20 with electric power via one of the signal terminals 25 of the camera body 20. After the camera body 20 is supplied with sufficient power, in step S106, the imaging-device cleaning apparatus 10 transmits a control signal that commands a cleaning mode to the camera body 20.

Upon receipt of a cleaning-mode command in step S106, the process proceeds to step S107. In step S107, the camera body 20 carries out a mirror-up and an opening of the shutter operation. After the completion of the mirror-up and the opening of the shutter operation, the camera body 20 transmits a control signal notifying the imaging-device cleaning apparatus 10 of the completion of the mirror-up and the opening of the shutter via the signal terminals 25. Next, the process proceeds to step S108, where the imaging-device cleaning apparatus 10 extends the nozzle 12a, as shown in FIG. 4. While the nozzle 12a is extending, in step S109, the obstacle detection unit 12b mounted on the top of the nozzle 12a attempts to detect any obstacles. Herein, the obstacle may be the mirror 22 or the shutter curtain 23 that prevents the nozzle from extending. If there are no obstacles, then the process proceeds to step S110. In step S110, the imaging-device cleaning apparatus 10 rotates the built-in fan 18 to eject an air jet from the nozzle 12a.

On the other hand, if in step S109 the obstacle detection unit 12b comes into contact with an obstacle (e.g., the mirror 22 or shutter curtain 23) during the extension of the nozzle 12a, then the process proceeds to step S114 to carry out an error process. The error process stops the extension of the nozzle 12a, stores the nozzle 12a in the imaging-device cleaning apparatus 10, and displays a message on the display unit 16 to notify a user of detecting the obstacle. After the error process, the cleaning operation finishes.

Following step S110, in step S111, a determination is made whether a predetermined time (i.e., cleaning time), which the user specifies in the above-described standby state of step S102, has elapsed. If the time has not elapsed, then the process returns to step S110. If the time has elapsed, the imaging-device cleaning apparatus 10 stops the fan 18, collapses the nozzle 12a, stores the nozzle 12a in the imaging-device cleaning apparatus 10, and displays a message on the display unit 16 to notify the user that the cleaning operation has finished.

In this embodiment, the following modifications can be made.

The air blower unit may include a plurality of air outlets. With reference again to FIG. 4, the nozzle 12a is a single tube with a circular cross-section. Instead of the extending section with a circular cross-section, a casing with a rectangular cross-section slightly smaller than that of the imaging section and with a plurality of substantially equally spaced tubes inside may be used. In this case, protrusions are provided at the four corners of the top end of the rectangular casing and the obstacle detection units 12b are disposed on the protrusions. In addition, any other structure that would enable practice of the present invention is applicable.

In the above-described embodiment, air is supplied by a fan. Alternatively, compressed air may be supplied by an external device, such as a spray can or a pump. To take in external compressed gas, the structure of the intake duct 19a may be changed so that a spray can containing compressed gas or a tube for feeding the compressed gas may be attached. Furthermore, an entire nozzle segment may be composed of an extendable narrow tube and a jet of compressed gas may be directly ejected against the imaging section. In addition, any other method for supplying air that would enable practice of the present invention is applicable.

In the above-described embodiment, air is supplied by a fan. Alternatively, the removing unit may include a wiper to wipe the imaging surface, or a wiper having an acrylic brush may be coupled with the top end of the extendable part of the imaging-device cleaning apparatus 10. The longitudinal length of the wiper is identical to the longitudinal length of the imaging section. The extendable part is designed to extend so that the wiper touches the imaging surface. An obstacle detection unit is mounted on the wiper. When the wiper touches the imaging surface, the obstacle detection unit detects the contact and, in turn, the wiper may be controlled to automatically slide on the imaging surface. In addition, the removing unit may comprise any other structure that would enable practice of the present invention.

In the above-described embodiment, the imaging-device cleaning apparatus is powered from an AC power supply. The present invention is not limited thereto, and any method of supplying power to the imaging-device cleaning apparatus that would enable practice of the present invention is applicable. For example, the power may be supplied from the camera body 20. In this case, the camera body 20 may supply the power to the imaging-device cleaning apparatus 10 via one of signal terminals 25. Moreover, the imaging-device cleaning apparatus 10 may include a rechargeable battery to charge power from the camera body.

Furthermore, the detection of obstacles may be carried out as follows: the imaging-device cleaning apparatus 10 includes a range finder and emits ranging light from the back side of the imaging-device cleaning apparatus 10. If the mirror-up and the opening of the shutter are successful, the distance between the back side of the imaging-device cleaning apparatus 10 and the imaging surface is properly measured. On the contrary, if the mirror-up and the opening of the shutter are unsuccessful due to malfunction of the camera body 20, a distance between the back side of the imaging-device cleaning apparatus 10 and the mirror 22 or the shutter 23 is measured at a distance that is shorter than the proper distance. This measured distance may be used for the determination of the presence of some obstacle. In addition, any method of detecting obstacles that would enable practice of the present invention is applicable.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A camera on which a cleaning apparatus can be removably attached thereto, the cleaning apparatus cleans an image sensor of the camera, the camera comprising:
   a mount for detachably supporting the cleaning apparatus;
   a signal terminal that electrically connects to the cleaning apparatus supported by the mount;
   a shutter unit that alternately travels between an open state where the object light reaches the image sensor and a closed state where the object light does not reach the image sensor; and
   a control unit that controls the shutter unit,
   wherein the control unit travels the shutter unit to the open state, when receiving a first signal transmitted from the cleaning apparatus supported by the mount via the signal terminal, and transmits a second signal to the cleaning apparatus via the signal terminal after the shutter unit is traveled to the open state.

* * * * *